J. O. Minor,
Hedge Shears.
N° 67,207. Patented July 30, 1867.
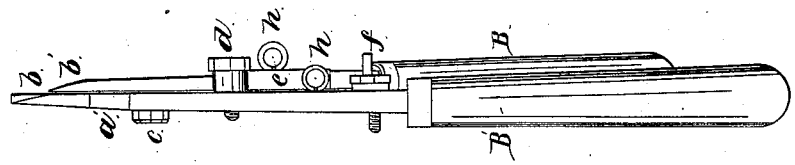
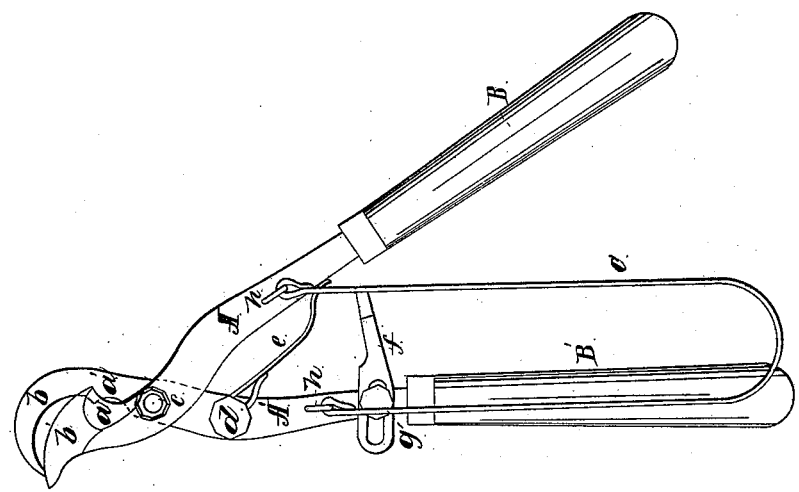
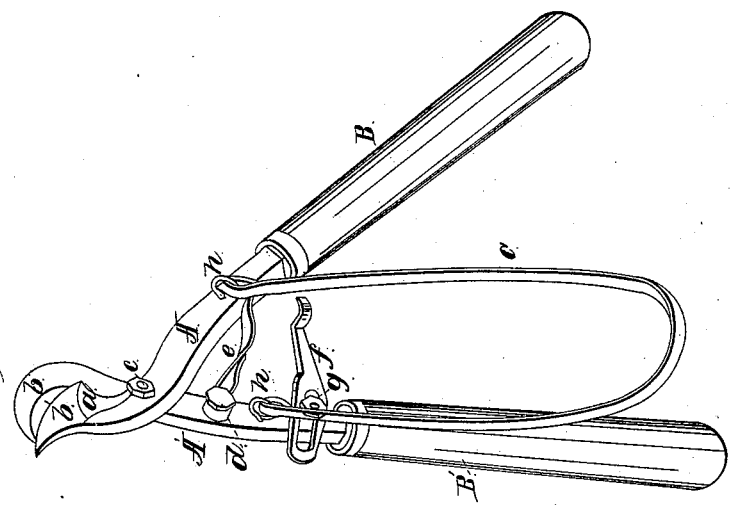
Witnesses.
Inventor:
John O. Minor

United States Patent Office.

JOHN O. MINOR, OF WAPELLO, IOWA.

Letters Patent No. 67,207, dated July 30, 1867.

IMPROVEMENT IN HEDGE-SHEARS.

*The Schedule referred to in these Letters Patent and making part of the same.*

TO ALL WHOM IT MAY CONCERN:

Be it known that I, John O. Minor, of Wapello, in the county of Louisa, and State of Iowa, have invented an Improvement in Hedge-Shears; and I do hereby declare that the following is a full, clear, and exact description thereof, reference being had to the accompanying drawings, making a part of this specification, in which—

Figure 1 is a perspective view of the improved shears complete.

Figure 2 is a side view of the same.

Figure 3 is an edge view of the shears.

Similar letters of reference indicate corresponding parts in the several figures.

This invention relates to an improvement in shears which are designed particularly for trimming hedges, and which are applicable for trimming shrubs generally.

The nature of my invention consists in providing shear-blades, which are adapted for trimming small twigs, with hooked cutting-edges, which are near the fulcrum of the blades, so as to adapt them for holding and severing strong branches, which could not be conveniently cut by the ordinary form of shears or trimming-blades, as will be hereinafter described. It also consists in providing hedge-trimmers with a spring, which will assist in opening them, in connection with an adjustable stop, which will admit of regulating the closing of the blades, and also with a shoulder-strap, by which the instrument can be supported by the neck of the person using it, as will be hereinafter described.

To enable others skilled in the art to understand my invention, I will describe its construction and operation.

In the accompanying drawings, A A' represent the shanks of two curved shear-blades, $b$ $b'$, which are adapted for trimming shrubbery. The ends of these shanks are inserted into handles B B', by which the instrument is held and operated. The trimming-blade $b$, on the shank A', is curved in the form of a hook, and the trimming-blade $b'$, which cuts against this hooked blade $b$, is curved, as shown in figs. 1 and 2. The cutting-edges of these two blades are designed for trimming small twigs, where comparatively little expenditure of power is required, and where there is no liability of straining the blades. For the purpose of severing large and strong branches, where considerable power is required, I construct upon the shear-blades, and as near as possible to the fulcrum-pin $c$ thereof, two curved cutting-edges $a$ $a'$, which will embrace a branch to be cut off, and hold it firmly while being severed. By having these cutting-edges so near the fulcrum-pin $c$, a great advantage is gained in applying the required power, and there will be little or no tendency of the blades separating or being strained in cutting strong branches. A spring, $e$, is secured by a screw, $d$, to the shank A', so as to act upon the shank A, when handles B B' are pressed together, and thus force the cutting-blades apart when the pressure upon the handles of the shears is released. This spring will greatly assist the operator in opening the cutting-blades after each cutting stroke. An adjustable stop, $f$, is applied to the shear-arm or shank A', by means of a set-screw, $g$, which passes through an oblong slot made through said stop, as shown in figs. 1 and 2. The bent end of this stop is adapted for receiving against it the arm or shank A, when the cutting-edges are brought together in proper position. By adjusting the stop $f$, the cutting-edges of the shear-blades can be made to overlap more or less, as may be required. For assisting the operator in supporting the shears while trimming hedges I employ a strap, C, which is attached by its ends to eyes $h$ $h$ upon the shanks A A', and which is of sufficient length to pass over the shoulder or neck of the person using the instrument, thereby enabling him to apply power to advantage while reaching some distance from his body.

Having described my invention, what I claim as new, and desire to secure by Letter Patent, is—

1. Constructing shears with cutting-edges $b$ $b'$ and cutting-edges $a$ $a'$, substantially in the manner described and for the purposes specified.

2. The adjustable stop $f$, applied to one of the shear-arms, substantially as and for the purpose described.

3. The supporting-strap C, applied to trimming-shears substantially as described.

JOHN O. MINOR.

Witnesses:
R. E. Archibald,
D. H. Gillett.